United States Patent Office

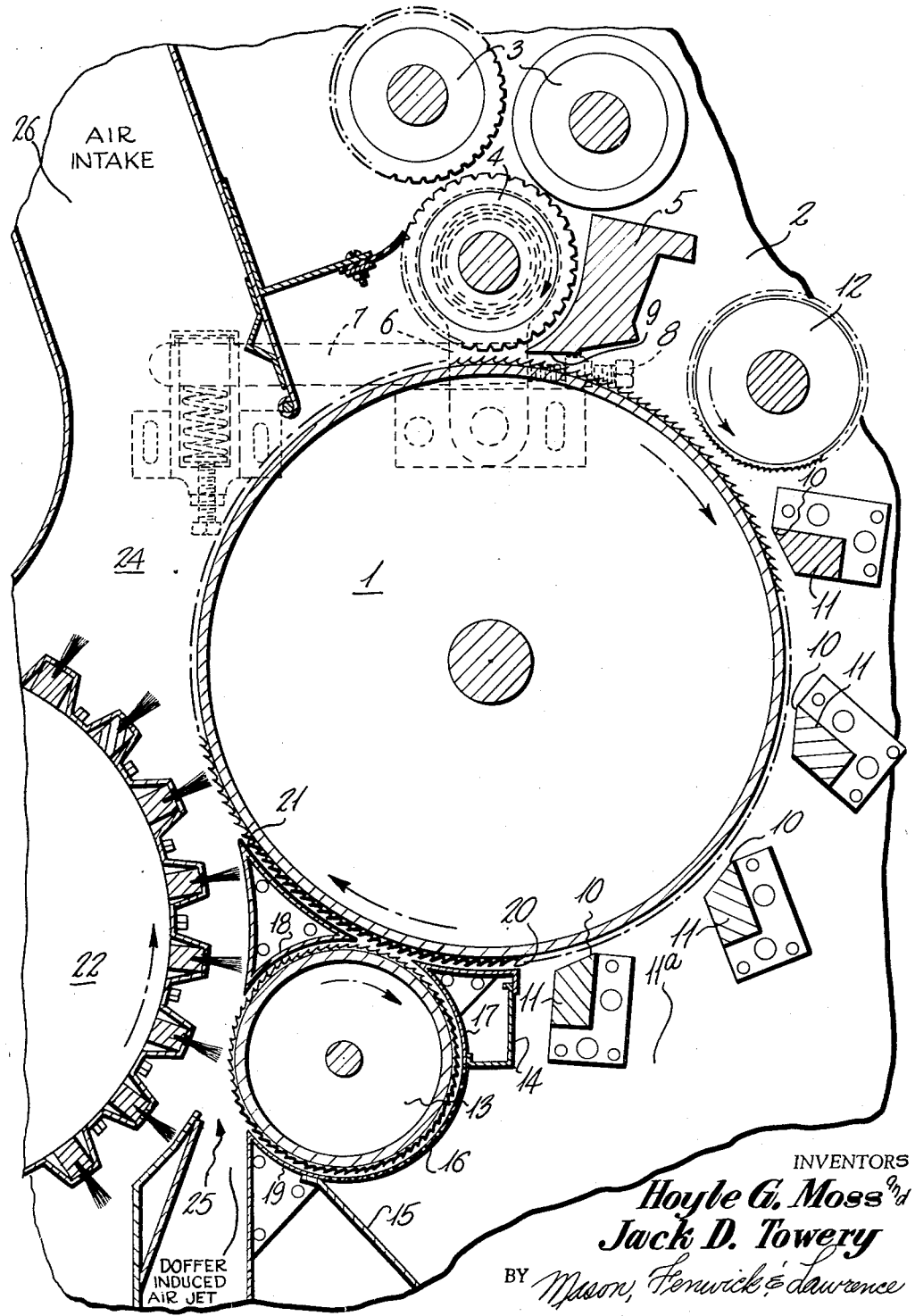

2,952,881
Patented Sept. 20, 1960

2,952,881

LINT COTTON CLEANER EMBODYING A LUMP ROLL AND CARDING CYLINDER

Hoyle G. Moss and Jack D. Towery, Lubbock, Tex., assignors, by mesne assignments, to Botany Industries, Inc., a corporation of New Jersey Filed May 6, 1957, Ser. No. 657,132

9 Claims. (Cl. 19—67)

This invention relates to cleaners for lint cotton, of the type in which a master toothed cylinder is supplied with cotton in the form of a bat, which is fed to the toothed cylinder by means which include a feed roll and a cooperating feed bar positioned adjacent the periphery of the toothed cylinder, yieldably related, between which the bat is squeezed while being fed, and thereby reduced in thickness as well as being under frictional pressure, which resists the pull of the teeth of the cylinder as they bite into the end of the bat. If the bat were of uniform thickness throughout its width, the holding pressure between feed roll and feed bar would also be uniform so that the line of severance by the teeth would be uniformly transverse and the feed of cotton to the cylinder would be uniform in a widthwise direction.

However, the bat is not always uniformly thick in a widthwise direction, so that as the thin areas pass between the feed roll and feed bar they are more loosely held between said members than the thicker areas, the result being that the teeth pluck or tear away a mass of cotton from the bat extending a distance back of the normal line of severance. This mass is deposited upon the cylinder all at once, and is the lump, the disposition of which is one of the objects of this invention.

In the type of lint cleaner under discussion the under face of the feed bar lies close to the teeth of the master cylinder, and the direction of rotation of the latter is such as to carry the lint fed to the cylinder beneath the feed bar, by which it is pressed down on to the teeth and firmly attached thereto and by them sequentially carried past a series of cleaning grid bars in operative proximity thereto, and then to a doffer. The amount of cotton that can become attached to the teeth is limited by the depth of the teeth, and in the interest of efficient clearing, the speed of the master cylinder is preferably such as to fill the teeth to something less than full capacity. But when a lump lands on the master cylinder its mass is greater than the capacity of the area of toothed surface that it overlies, so that the greater part of the lump does not become attached to the teeth but rides on the surface of the attached layer, in position to be knocked off by the grid bars and fall into the trash passage with the removed trash. It is an object of the present invention to provide means located between the feed bar and series of grid bars to disintegrate the lump and distribute it upon the master cylinder in fastened relation to the teeth of said cylinder.

A further object of the invention is the provision of a carding cylinder located between the series of grid bars and the doffer in close juxtaposition to the master cylinder for combing and paralleling the fringes of the fibers outstanding from the master cylinder, and removing any foreign matter that may have survived the cleaning treatment by the grid bars.

Other objects of the invention will appear as the following description of a practical embodiment thereof proceeds.

In the drawing, the sole figure is a vertical cross-section of a lint cotton cleaner embodying the principles of the invention, taken in a plane perpendicular to the axes of the several rolls and cylinders shown.

Referring now in detail to the drawing, the master cylinder 1, as illustrated, is a saw cylinder, it being understood that the specific type of toothed surface shown is the equivalent of other types of teeth which may be found useful for the intended purpose. The shaft of the master cylinder as well as the shafts of the other correlated rolls and cylinders are journaled in the parallel opposite side walls of a casing 2, which is only fragmentally shown. Above the master cylinder is the pair of cooperating feed rolls 3, between which the bat passes, and which may be the lowermost member of a series of such pairs (not shown) with a drawing action between them for thinning the bat. Beneath the rolls 3 are the resiliently related feed roll 4 and feed bar 5. In this embodiment of the invention the feed bar is fixed in the opposite sides of the casing while the shaft of the feed roll is journaled in swinging brackets 6, mounted on said opposite sides, the brackets having spring supported arms 7 which bias the feed roll toward the feed bar. An adjustable stud 8 for each bracket keeps the feed roll a minimum distance from the feed bar. The feed roll and feed bar are positioned close to the periphery of the master cylinder. The bat extends between the feed roll and feed bar, being by them fed to the master cylinder, the teeth of which progressively disintegrate the end of the bat by combing cotton therefrom, which is carried about the nose of the feed bar. The pull of the teeth on the bat is resisted by the normally substantially constant resilient holding pressure upon the bat by the feed roll and feed bar. When a portion of the bat of unequal thickness widthwise reaches the pressure line between the feed roll and feed bar, the thin spot is not firmly held, so that the pull of the teeth tears the bat away, in the area of the thin spot to a point back of the normal pressure line. This torn away mass falls on the master cylinder without being at once distributed thereupon, forming the lump which is carried into the space between he lower face 9 of the feed bar and master cylinder and somewhat compressed so that the cotton of the lower portion of its mass becomes fastened to the teeth of the master cylinder as far as the teeth can penetrate it, the upper part riding with precarious frictional cohesion upon the fastened layer, in a position to encounter the edges 10 of the grid bars 11 and be scraped off, falling into the trash chamber 11a of the casing, and becoming lost with the trash extracted by said grid bars.

In order to disintegrate this lump and to distribute the cotton therefrom in fastened relation upon the teeth of the master cylinder, the present invention provides a toothed cylinder 12 herein designated as the "lump roll," positioned between the feed bar and the foremost grid bar, and set closer to the master cylinder than the under side of the feed bar, at such distance from the master cylinder as to let pass the cotton which is attached to the teeth of the master cylinder, but to pick off the lump, which rides upon the attached layer, compressively holding it against the teeth of the master cylinder while revolving at a relatively slow peripheral speed in comparison with that of the master cylinder, thereby allowing the latter cylinder to thoroughly comb the lump held in the teeth of the lump roll and at the same time to seat within the teeth of the master cylinder the cotton combed off of the lump. The combing function always tends to parallel the fibers and facilitate the removal of the trash.

It will be noted that the lump roll rotates in the opposite direction to the master cylinder with the sloping sides of its teeth leading, so that cotton is not carried around on the lump roll.

The cotton from the lump is distributed along a more or less extensive arc of the surface of the master cylinder and it will be understood that there is room between the teeth throughout this arc to receive and seat the cotton. The reason for the existence of this room is that when the portion of the bat constituting the thin spot is torn away and deposited all at once on to the teeth of the master cylinder, a hole is left in the bat and a corresponding dearth of feed to the area on the master cylinder corresponding to the position of the thin spot until the feed roll has again brought an intact end of the bat within range of the teeth of the master cylinder. In practice it is found that the distribution of the lump on the teeth of the master cylinder is more efficiently performed if the lump roll is set to rotate somewhat faster than the feed roll. The explanation of this is that if the speed ratio between the adjacent sides of the lump roll and master cylinder were precisely the same as the speed ratio between the feed roll and master cylinder, the lump would be picked off of the teeth of the master cylinder with the same suddenness with which it was deposited upon the master cylinder from the feed roll. But if the speed differential between the lump roll and master cylinder is less than that between the feed roll and master cylinder, the disintegration of the lump is spread over a somewhat longer time interval, resulting in somewhat less crowding of the lump and a correspondingly more uniform distribution of fibers upon the master cylinder. It follows from the above description that a layer of substantially uniform thickness throughout its width is presented to the grid bars, resulting in maximum efficiency in the performance of the cleaning function by said bars.

While the lump roll is effective in dissolving the lumps, which are large masses derived from thin spots in the bat, the homogeneity of the latter is affected by the inclusion of small tufts which originate in the cotton supplied to the feeding system, and are of sufficiently small size to be within the normal thickness of the bat when fed to the master cylinder, so that they pass uninterruptedly beneath the lump roll. These are aggregations of fibers coherently associated through having become intermingled or otherwise frictionally adhered. On account of the disorderly arrangement of their fibers the tufts become fastened to the teeth of the master cylinder by less than the whole number of their fibers, and while they are for this reason more readily detached than fibers which are more uniformly seated, these tufts generally survive the cleaning action of the grid bars, which may not be so thorough due to the desultory arrangement of their fibers, and still appear as tufts in the finished cotton.

The cleaner of the present invention introduces a carding roll 13, which removes the tufts from the master cylinder, provides a supplemental cleaning of the same, and delivers them to the doffer, but also affords a final combing treatment for all of the cotton, so as to give a better and smoother appearance to the cotton sample, which is most desired by buyers and mills.

The carding roll 13 is positioned in the casing beyond the series of grid bars and separated from the trash chamber 11a by transverse baffles 14 and 15, which support the arcuate screen 16, the latter being coaxial with the carding roll and lying close to the periphery of said roll.

The carding roll is further isolated from the general chamber of the casing by the imperforate shields 17, 18 and 19, which are spaced from one another to provide the spaces 20 and 21, the former opening to the master cylinder and the latter to the doffer 22. The carding roll is a toothed cylinder which rotates more slowly than the master cylinder, in the same direction, and has the abrupt faces of its teeth facing in the leading direction.

The carding roll is spaced from the master cylinder at such distance that the teeth of the carding roll comb through the outstanding fingers of the fibers that are well seated in the teeth of the master cylinder and dislodging the tufts, which are more precariously seated. The tufts become fastened in the teeth of the carding cylinder and carried around through the arc circumscribed by the screen 16 when residual trash, missed by the grid bars and loosened by the impact incident to the transfer of the tufts from the master cylinder to the carding roll, is thrown off centrifugally against the screen, passing through the perforations into the common trash chamber 11a. The tufts are then combed off of the carding roll by the doffer 22. Meanwhile, the doffer is taking the homogeneously seated cotton which went past the carding roll undisturbed, from the master cylinder. The doffer rotates faster than the master cylinder and very much faster than the carding roll. Therefore, the doffer combs the tufts at the time it takes them from the master cylinder, and they are combed again when the doffer moves them against the backs of the teeth of the master cylinder. As a result of this double rolling, the tufts have lost their identity as tufts, having been reduced to the state of parallel fibers, indistinguishable from the fibers on the master cylinder which pass direct to the doffer.

The doffer operates in a flue 24 and by the revolution of its rows of brushes it sets up a peripheral air flow which entrains air from the passage 25, inducing an air jet directed toward the point of transfer of the cotton from the carding roll to the doffer, the air jet assisting in the doffing. The peripheral air flow also induces an inflow of air through the air intake 26 which assists in carrying the lint around on the brushes to a discharge point, not shown.

While we have in the foregoing disclosure described what we know to be a practical form of the invention, it will be understood by those skilled in the art that the specific details of construction and arrangement of parts, as shown, are by way of example and not to be construed as limiting the scope of the invention.

What we claim is:

1. Cleaner for lint cotton comprising a toothed master cylinder, means for feeding lint cotton to said master cylinder in the form of a bat, a series of cleaning grid bars displaced circumferentially beyond the feeding point, in the path of the cotton fringe outstanding from said master cylinder, said feeding means including a feed roll and a feed bar compressively related to the bat and between which the bat passes and by which the end of the bat is presented to the teeth of the master cylinder, said feed bar being positioned between said feed roll and said series of grid bars and having an under face narrowly spaced from the periphery of said master cylinder so as to crowd the lint cotton passing beneath it into seating engagement with the teeth of said master cylinder to the extent of the depth of said teeth and to let pass lumps of cotton torn from patch areas of the bat and free-riding on the seated cotton, and a toothed lump roll situated between said feed bar and series of grid bars, rotating at a slower peripheral speed than said master cylinder and in such proximity thereto as to apprehend and hold the free-riding lumps, permitting the teeth of the master cylinder to comb through the lump progressively disintegrating the lump and distributing the lint therefrom in seated relation on the such teeth areas of the master cylinder at the rear of the lump, as are sparsely occupied through prior registration of said areas with bat areas from which the lump was torn, said lump roll rotating in the opposite direction to said master cylinder so that the adjacent peripheral arcs of said lump roll and master cylinder travel in the same direction.

2. Cleaner for lint cotton as claimed in claim 1, the teeth of the lump roll having sloping faces that lead in the rotation of said lump roll so that cotton is not transferred to said lump roll.

3. Cleaner for lint cotton comprising a toothed master cylinder, means for feeding cotton in the form of a bat, endwise into the path of the teeth of the master cylinder, cleaning means cooperating with said master cylinder at a point beyond said feeding means, for cleaning the outstanding fringe of cotton seated in the teeth of said master cylinder, a toothed lump roll in proximate tangency to said master cylinder situated between said feeding and cleaning means, spaced from said master cylinder at such distance as to let pass the seated lint, but to apprehend lumps of cotton torn from said bat free-riding on said seated lint and hold them in operative proximity to the teeth of the said master cylinder to be disintegrated thereby and the detached lint particles to be distributed in seated relation upon said master cylinder, a doffer, and a toothed carding roll between said cleaning means and doffer, in operative proximity to both said master cylinder and doffer for transferring from the former to the latter, tufts precariously seated in the teeth of said master cylinder, and of such dimension as to have passed said lump roll, and cleaning means adjacent the periphery of said carding roll for cleaning said tufts enroute on said carding roll.

4. Cleaner for lint cotton as claimed in claim 3, said doffer being tangent to both said carding roll and master cylinder.

5. Cleaner for lint cotton as claimed in claim 3, said doffer being of the brush type, and being tangent to said carding roll, and to said master cylinder at a point posterior to said carding roll whereby said tufts are subjected to successive combing operations.

6. Cleaner for lint cotton as claimed in claim 3, said doffer being of the brush type, and being tangent to said carding roll, and to said master cylinder at a point posterior to said carding roll, whereby said tufts are subjected to successive combing operations, and a perforated screen underlying said carding roll and in the path of the lint fringe outstanding from said carding roll for removing trash from said lint and providing for its discharge through said screen.

7. Cleaner for lint cotton comprising a toothed master cylinder, means for feeding cotton in the form of a bat endwise into the path of the teeth of the master cylinder, cleaning means cooperating with said master cylinder spaced therefrom at such distance to be impactively engaged by the centrifugally outstanding lint on said master cylinder, a toothed carding roll posterior to said cleaning means, in proximate tangency to said master cylinder, rotating in the opposite direction thereto, having the abrupt faces of its teeth facing oppositely thereto, and positioned in operative proximity to said master cylinder to transfer from said master cylinder tufts of cotton precariously seated in the teeth of said master cylinder and of such dimension as to have passed said cleaning means without becoming detached and a brush type doffer tangent to said carding roll, and to said master cylinder at a point beyond said carding roll whereby the lint of said tufts is subjected to successive combing operations.

8. Cleaner for lint cotton as claimed in claim 7, said doffer being of the brush type, and being tangent to said carding roll, and to said master cylinder at a point beyond said carding roll, whereby the lint of said tufts is subjected to successive combing operations, and a lint flue enveloping both points of tangency of said doffer, with the respective carding roll and master cylinder.

9. Cleaner for lint cotton comprising a toothed master cylinder, means for feeding lint cotton to said master cylinder in the form of a bat, a series of cleaning grid bars displaced circumferentially beyond the feeding point, in the path of the cotton fringe outstanding from said master cylinder, said feeding means including a feed roll compressively related to the bat, and a feed bar between which feed roll and bar the bat passes and by which the end of the bat is presented to the teeth of the master cylinder, said feed bar being positioned between said feed roll and said series of grid bars and having an under face narrowly spaced from the periphery of said master cylinder so as to crowd the lint cotton passing beneath it into seating engagement with the teeth of the master cylinder to the extent of the depth of said teeth, and to let pass lumps of cotton free-riding on the seated cotton, and a toothed lump roll situated between said feed bar and series of grid bars, rotating at a slower peripheral speed than said master cylinder and in such proximity thereto as to apprehend and hold the free-riding lumps, permitting the teeth of the master cylinder to comb through the lump progressively disintegrating it and distributing the lint therefrom in seated relation on the sparsely occupied teeth of the master cylinder at the rear of the lump, said lump roll being driven at a somewhat faster peripheral speed than the feed roll and rotating in the opposite direction to said master cylinder so that the adjacent peripheral arcs of said lump roll and said master cylinder travel in the same direction.

References Cited in the file of this patent

UNITED STATES PATENTS

| | | |
|---|---|---|
| 2,072,978 | Cumpston | Mar. 9, 1937 |
| 2,300,978 | Sheppard | Nov. 3, 1942 |
| 2,676,361 | Senior et al. | Apr. 27, 1954 |
| 2,704,862 | Moss | Mar. 29, 1955 |
| 2,747,235 | Wallace | May 29, 1956 |
| 2,830,328 | Day | Apr. 15, 1958 |